Jan. 8, 1924.  1,479,879

J. STEINHILPER

ANTIGLARE DEVICE FOR AUTOMOBILE HEADLIGHTS

Filed March 1, 1923

Inventor
J. Steinhilper,

By C. A. Snow & Co.
Attorneys

Patented Jan. 8, 1924.

1,479,879

UNITED STATES PATENT OFFICE.

JACOB STEINHILPER, OF WILLIAMSPORT, PENNSYLVANIA.

ANTIGLARE DEVICE FOR AUTOMOBILE HEADLIGHTS.

Application filed March 1, 1923. Serial No. 622,081.

*To all whom it may concern:*

Be it known that I, JACOB STEINHILPER, a citizen of the United States, residing at Williamsport, in the county of Lycoming and State of Pennsylvania, have invented a new and useful Antiglare Device for Automobile Headlights, of which the following is a specification.

This invention relates to anti-glare devices for automobile headlights.

The object of the invention is to provide a simple and efficient attachment for ready application to an automobile headlight which will afford sufficient light for the driver of the vehicle equipped with it, and projects the light rays down onto the roadway, thus avoiding blinding of approaching vehicle drivers.

Another object is to provide a device of this character which may be cheaply constructed and easily applied to headlights already in use without making any changes therein and which may be readily removed from one headlight and applied to another.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
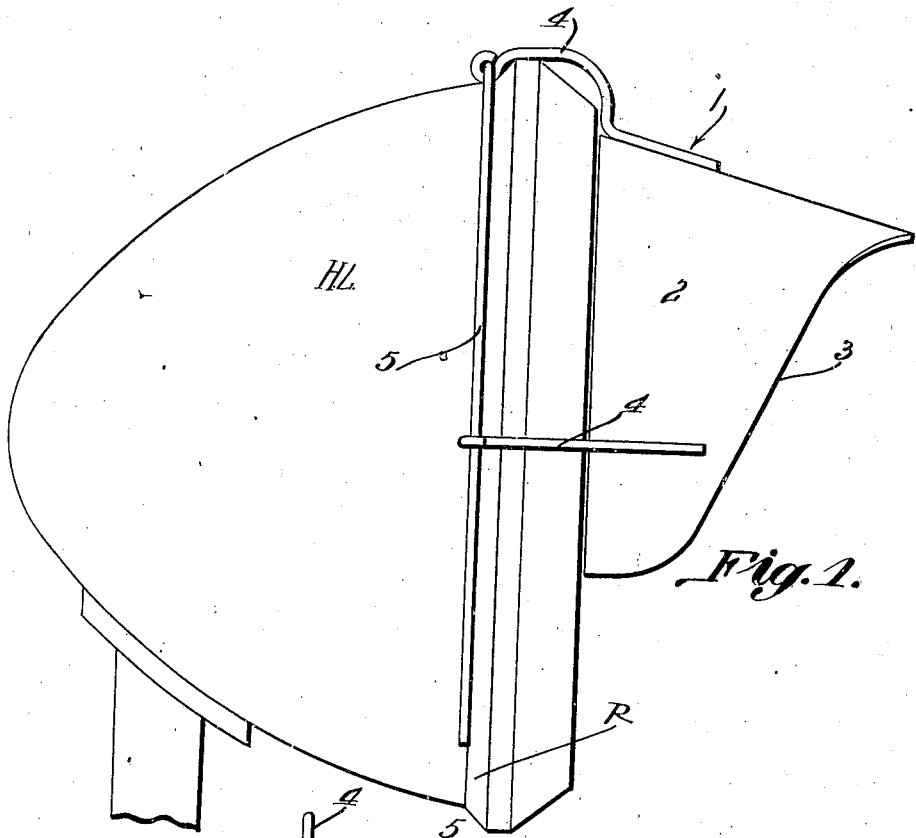
Figure 2:
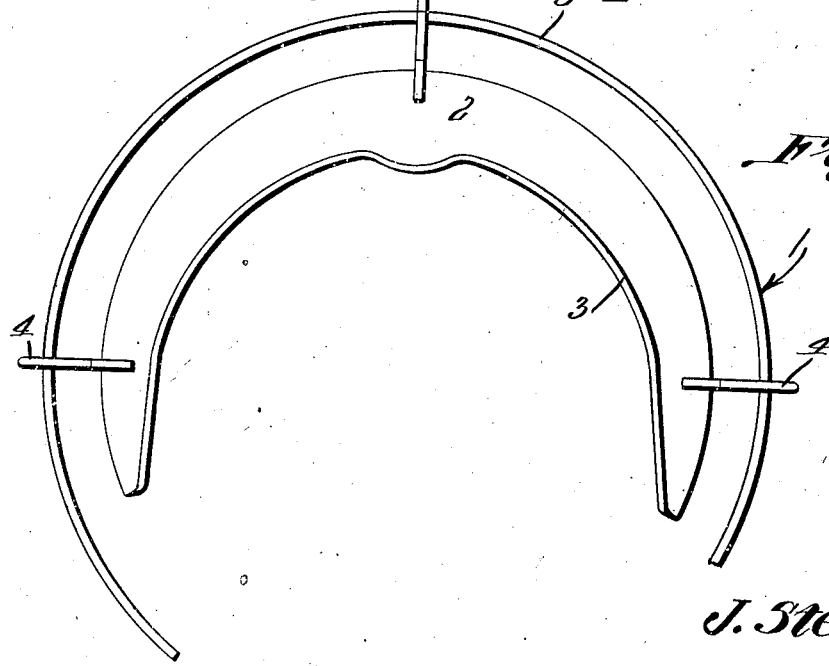

Figure 1 represents a side elevation of a headlight with this improved attachment shown applied, and Fig. 2 is a front elevation of the attachment detached.

In the embodiment illustrated, the attachment 1 constituting this invention comprises a hood 2 constructed of sheet metal preferably of aluminum or tin and preferably provided on its inner face with a reflecting surface, although not necessarily so.

This hood 2 is downwardly and forwardly inclined as shown in Fig. 1 and the outer edge 3 thereof tapers toward the ends of the hood so that the sides of the hood will be narrower than the top thereof. This hood 2 is provided with a plurality of spring wire clips 4 any desired number of which may be employed, three being here shown. These clips 4 have connected with their rear ends, a spring wire attaching member 5 which is in the form of a broken circle and is designed to yieldingly engage the headlight HL at the rear of the rim R.

In the use of this device, the hood 2 is positioned at the top of the headlight as shown in Fig. 1, with its rear edge abutting the front face of rim R and the clamping ring 5 is engaged with said headlight in rear of the rim R with the clips 4 bowed outwardly and spanning said rim and yieldably holding the device 1 in operative position with the hood securely clamped against the face of rim R so that it will deflect the light rays downward onto the roadway in front of the vehicle and prevent them from blinding approaching vehicle drivers.

Various changes in the form, shape, proportion and other minor details of construction may be made without departing from the principle or sacrificing any of the advantages of the claimed invention.

I claim:—

A device of the class described comprising a hood having its rear edge shaped to conform to the face of the headlight rim in connection with which it is to be used, a spring wire clamping ring, and transversely extending spring clips connecting said hood and ring, said clips being secured at one end to the hood and at their other end to the ring and operating as spacers for the hood and ring, the portion between the hood and ring being bowed outwardly and of a length to span the rim of the headlight, said ring being designed to fit the headlight at the rear of its rim whereby the hood is held in abutting engagement with the front face of the rim when applied.

In testimony that I claim the foregoing as my own, I have hereto affixed my signature in the presence of two witnesses.

JACOB STEINHILPER.

Witnesses:
CHARLES O. DITTMAR,
WALTER W. BROWN.